Fig. 3

INVENTORS.
John L. Ferguson &
Richard C. Talbot.
By Thiess, Olson & Mecklenburger
Attys.

United States Patent Office 2,702,110
Patented Feb. 15, 1955

2,702,110

APPARATUS FOR COLLECTING PACKAGES

John L. Ferguson and Richard C. Talbot, Joliet, Ill., assignors to J. L. Ferguson Company, Joliet, Ill., a corporation of Illinois Application November 16, 1950, Serial No. 196,028

7 Claims. (Cl. 198—21)

This invention relates to apparatus for collecting packages or other articles and more particularly for operating on packages disposed in a plurality of moving files and in irregular or random sequence and arranging them in a single moving file. It is an object of the invention to provide an improved method and apparatus of such character.

In the preparation of goods for shipment, it is frequent practice to funnel such goods from a plurality of sources, for example by a plurality of conveyor belts, to a single case loading machine which automatically inserts a predetermined number of packages or articles into a case in predetermined arrangement. One of the problems which arises in such a system is that of deploying the packages, which are received in random or irregular sequence and in a plurality of supply files, into a single outgoing file for feeding the loading machine, without interference between packages. It will be apparent that if the irregularly spaced packages in the supply files were merely thrust upon a conveyor running at right angles thereto, a package from one supply file might strike a package already placed on the conveyor with the result that one or both packages might be toppled over or knocked off the conveyor system.

In accordance with the invention, this problem is solved by the use of a cyclically operating machine which removes the packages from the supply files and places them on the single conveyor. Since the machine operates in cycles no packages are removed from the supply files and placed on the single conveyor except at automatically predetermined times. The time interval for one cycle of the machine is sufficient to permit removal of the displaced packages by the single conveyor before additional packages are placed thereon in the next operating cycle of the machine. Interference between packages is thereby eliminated.

Preferably, the machine removes one package from each of the supply files and places them on the single conveyor during each operating cycle thereof, provided that a package is available in each of the supply files at the beginning of such cycle. If, at the start of a cycle, a package has not reached the operating station in one or more of the supply files, the machine operates regardless of this and places on the single conveyor one package each from any one or more of the supply files in which a package is available at the beginning of that cycle. In this way, there is provided a constant flow of packages to the case loader as long as any one or more of the supply conveyors is delivering packages to the machine.

In accordance with the preferred embodiment of the invention a separate plunger is employed for each of the supply files for moving packages from the corresponding supply file to the single conveyor. These plungers are arranged to operate simultaneously if a package is available in each supply file at the beginning of an operating cycle. If no package is available in any one or more supply files at the start of an operating cycle the corresponding plungers do not operate during that cycle but will be operative during the next succeeding cycle if a package is fed to the machine in the corresponding supply file prior to the start of the next operating cycle. Such operation may be obtained through the use of a control device for each supply file, each being conditioned to cause operation of the corresponding plunger at the start of a cycle by the arrival, prior to that time, of a package at a position in which it may be operated upon by the corresponding plunger. This arrangement eliminates the possibility of a plunger operating at a time when a package is only partially in position to be moved by the plunger from a supply file to the single conveyor, an event which might cause interruption of operation of the machine or damage to the package or the machine.

The packages referred to above may be packaged goods such as goods in a cardboard, metal or glass container. However, the term package, as employed herein, is to be construed in its broadest sense wherein it includes any items of substantially uniform size and shape whether or not the "packages" actually constitute goods arranged in containers.

It is another object of the invention to provide an improved method and apparatus of the character indicated which substantially eliminate the possibility of interference between packages.

It is another object of the invention to provide an improved method and apparatus of the character indicated which substantially eliminate the possibility of damage to a package or to the operating machinery.

It is another object of the invention to provide improved apparatus of the character indicated which is simple, reliable and inexpensive.

It is another object of the invention to provide an improved method of the character indicated which is simple and reliable.

In the drawings in which like parts are designated by like reference numerals.

In the embodiment of the invention disclosed in the drawings, packages 20 of substantially uniform size and shape are advanced within the machine, in four parallel supply files A, B, C and D, by a single endless conveyor belt 21. The packages may be fed to the machine by any suitable means which are not shown in the drawings but which might be, for example, four separate conveyor systems bringing packages from four different sources.

The conveyor belt 21 operates over a pair of drums or rollers 22 and 23, and extends over a pair of idler rollers 24 and 25 and around a driving roller 26, each of these various rollers being rotatably mounted in the frame of the machine. Means for rotating the driving pulley or drum 26 will be described subsequently. Proper tension of the belt 21 can be maintained by an adjustable mechanism 27 for controlling the position of the roller 24, which mechanism may be of conventional form and accordingly will not be described in detail herein. The package supporting portion of the belt 21 between the rollers 22 and 23 slides over and is supported by a plate 21a which is secured to the frame of the machine.

Figure 1:
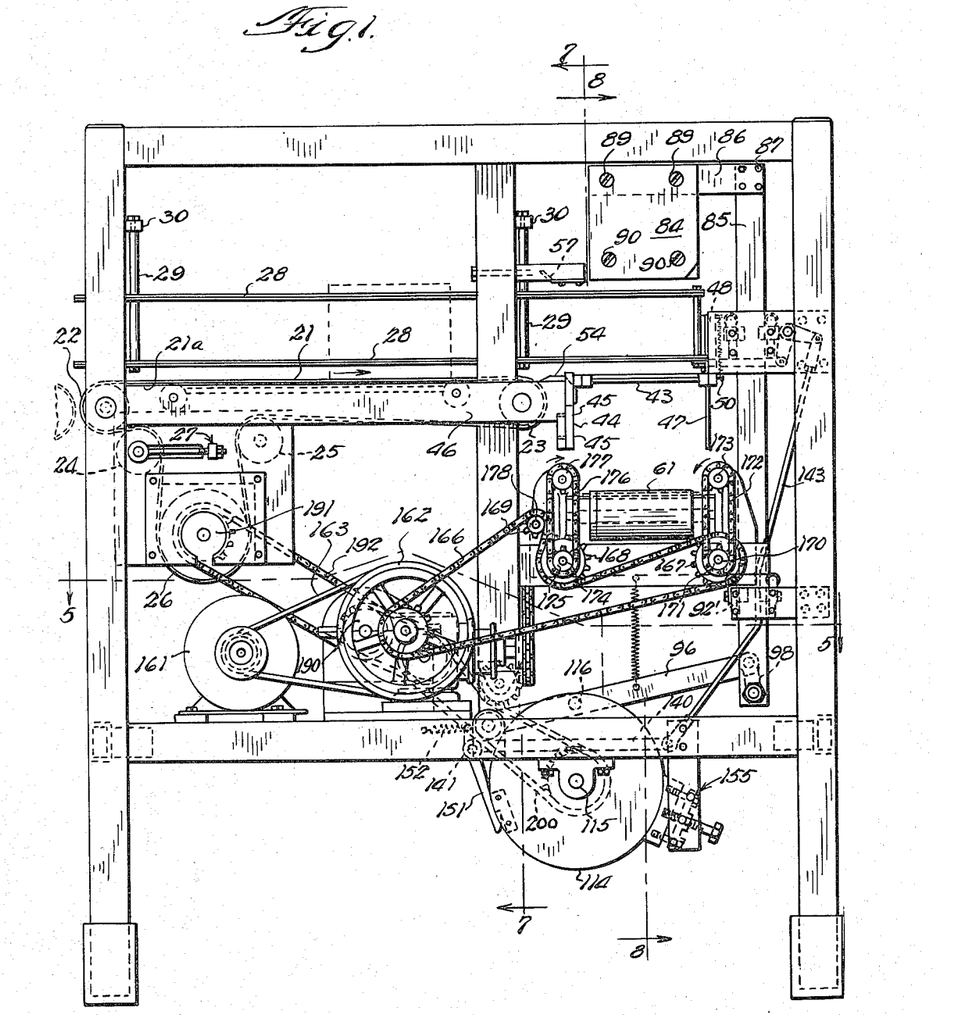
Fig. 1 is a side elevational view of a package collecting machine constructed in accordance with one embodiment of the invention.
Figure 2:
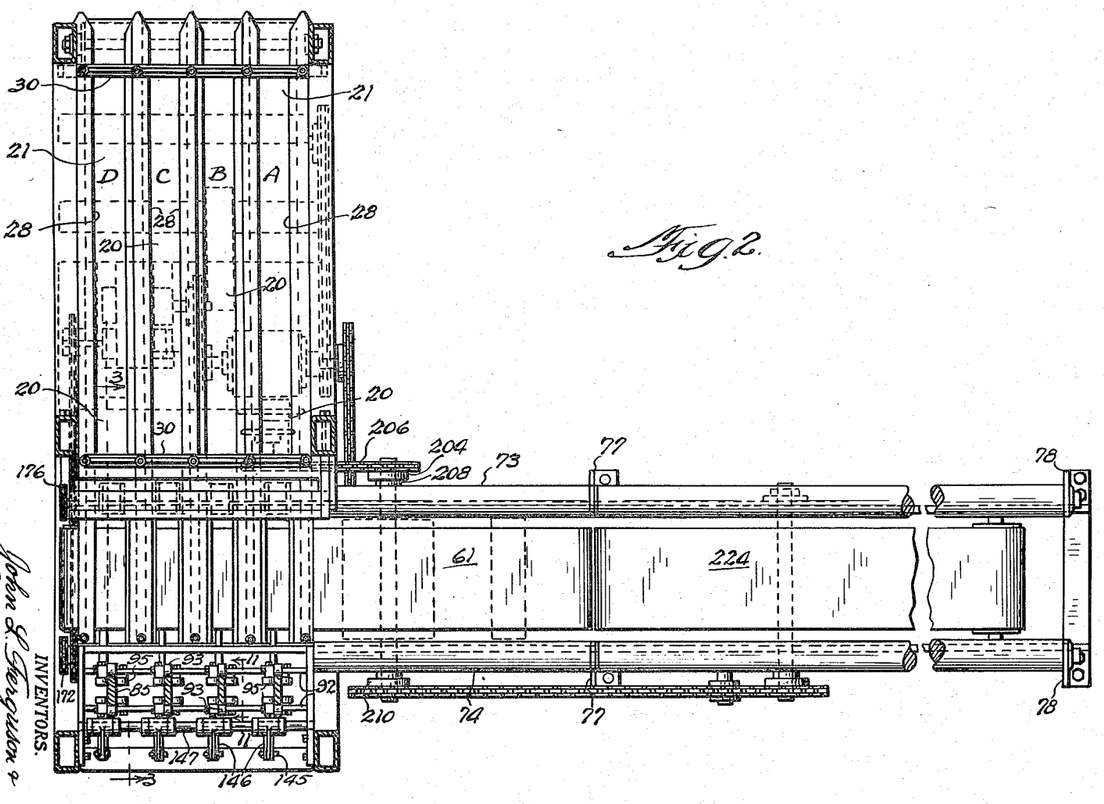
Fig. 2 is a plan view of the same machine.
Figure 7:
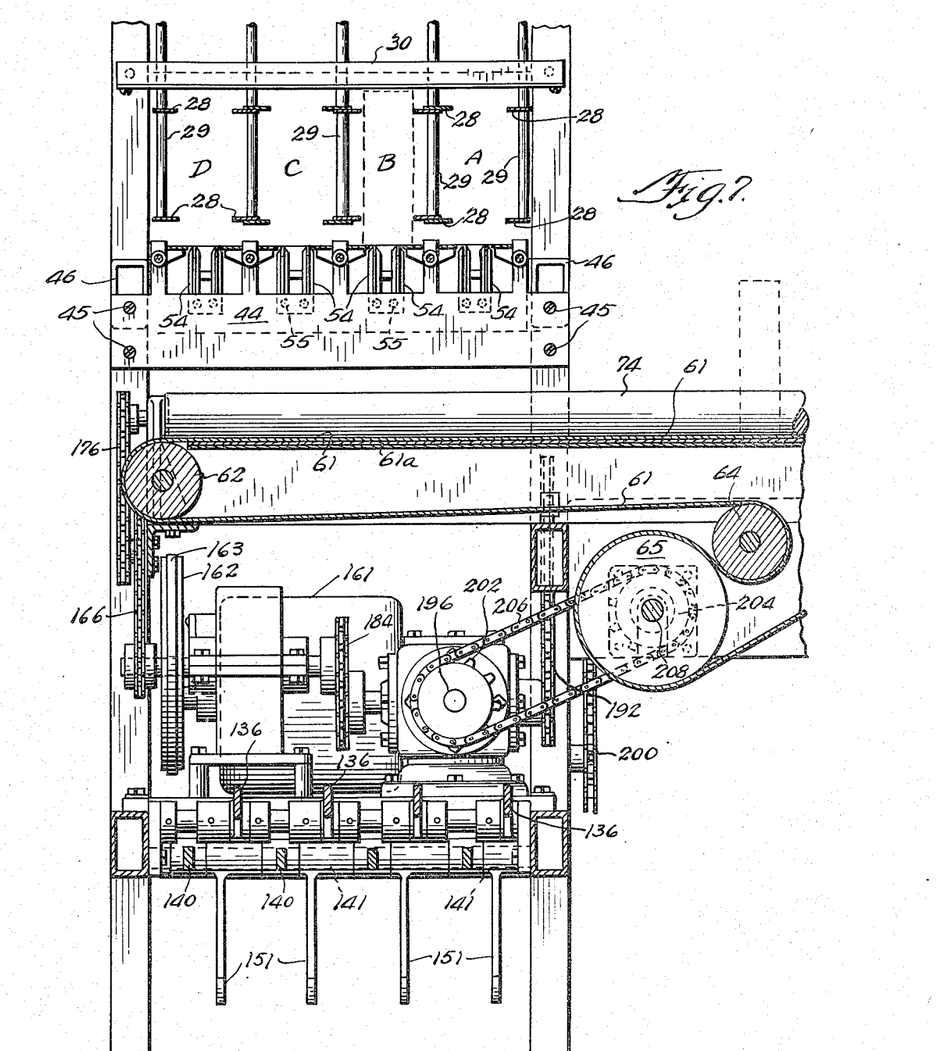
Fig. 7 is an enlarged partial cross-sectional view taken along the line 7—7 of Fig. 1.

The four lanes A, B, C and D on the belt 21 are defined by a series of dividers arranged in two tiers as may be seen best in Figs. 1, 2 and 7. Each lane is of such width as to permit passage of packages in single file. The two dividers at each side of each lane or file are supported by a pair of vertically extending spaced bars 29, which are in turn supported by brackets 30 secured to the frame of the machine.

It will be noted in Figs. 1 and 7 that the packages 20 stand on edge in the embodiment illustrated, and it is for this reason that two tiers of dividers are provided, the upper tier assuring that none of the packages will topple over and interrupt the operation of the machine.

Figure 9:
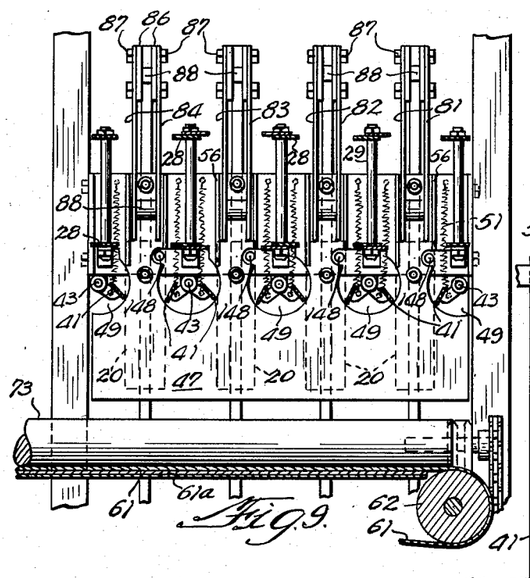
Fig. 9 is an enlarged cross-sectional view similar to Fig. 8 but showing only a portion of the apparatus in a different operating position.
Figure 10:
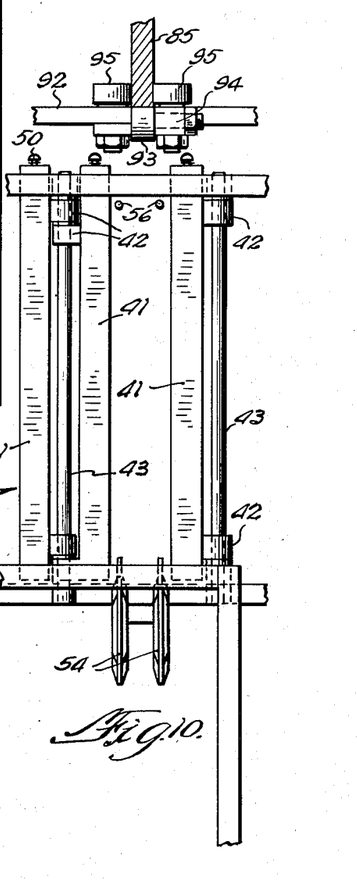
Fig. 10 is a detail cross-sectional view taken along the line 10—10 of Fig. 3.

As the packages 20 on the conveyor belt 21 reach the position of the roller 23 they continue to the right in Fig. 1, and are carried onto one of a series of trap doors 40 best seen in Figs. 7, 9, and 10. Each trap door 40 comprises a pair of plates 41, near each end of which there is secured a lug 42. Each of the two lugs 42 for any one trap door plate 41 is pivotally mounted on a horizontally extending rod 43, the ends of which are in turn secured to the frame of the machine. More specifically the rods 43 are secured at their left-hand ends, as viewed in Fig. 1, to a plate 44, best seen in Figs. 1 and 7. The plate 44 is in turn fastened at each end thereof by screws 45 to a horizontally extending frame member 46. The right-hand ends of the rods 43 extend through openings in an apron 47 and are secured to a plate 48, all as best seen in Figs. 3 and 9.

Figure 8:
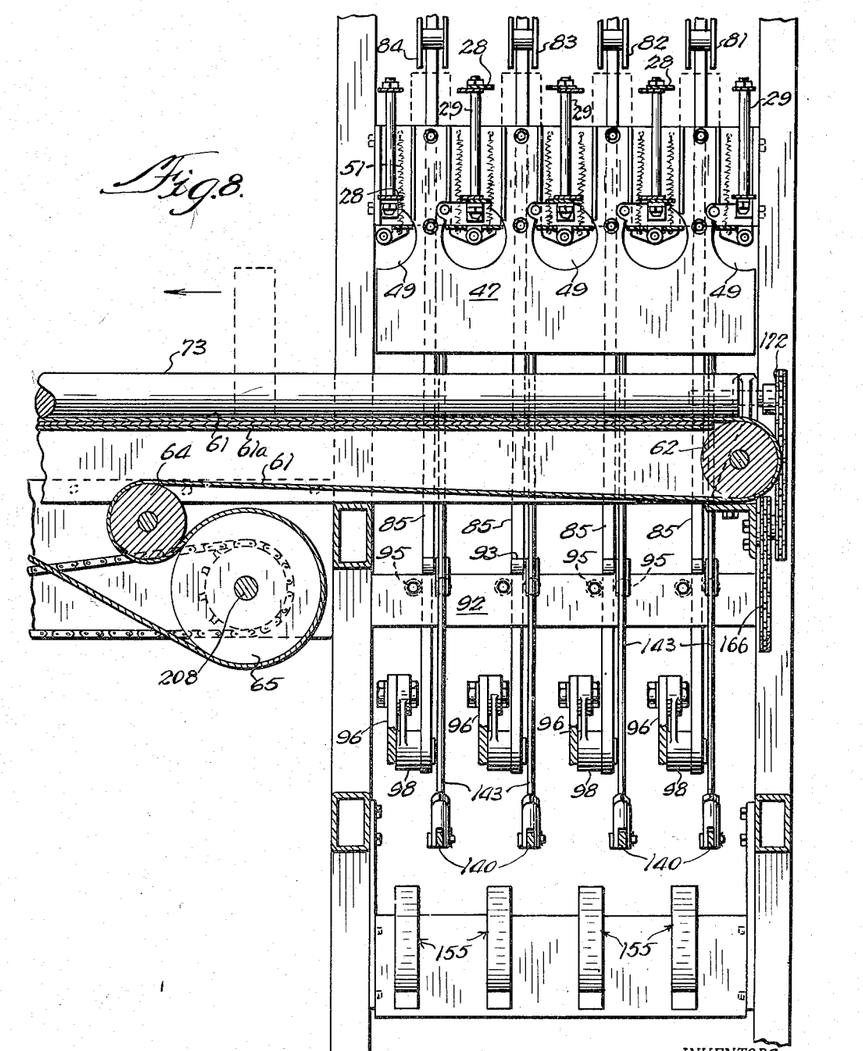
Fig. 8 is an enlarged partial cross-sectional view taken along the line 8—8 of Fig. 1.

The right-hand ends of the trap door plates 41 as viewed in Fig. 1 extend through substantially circular openings 49 in the apron 47 and there is secured to the outermost end of each a pin or screw 50. A plurality of tension springs 51, best seen in Figs. 3, 8 and 9, are secured at their lower ends to the pins 50 and at their upper ends to pins 52 embedded in the fixed plate 48. As will be seen best in Fig. 8, the springs 51 urge the respective trap door plates 41 upwardly to a position in which the right-hand end portions thereof engage the lower edge of the plate 48. Each trap door plate 41 is, however, resiliently pivotable downwardly to the position illustrated in Fig. 9, in which position the trap doors permit the passage downwardly therethrough of packages 20. The trap door plates 41 of each pair are so positioned with respect to each other that when they are in their normal or raised position, they may support a package 20 at the level of the conveyor belt 21. The springs 51 exert sufficient force that they may normally support the trap door plates 41 and a package 20 which may rest thereupon.

Figure 3:
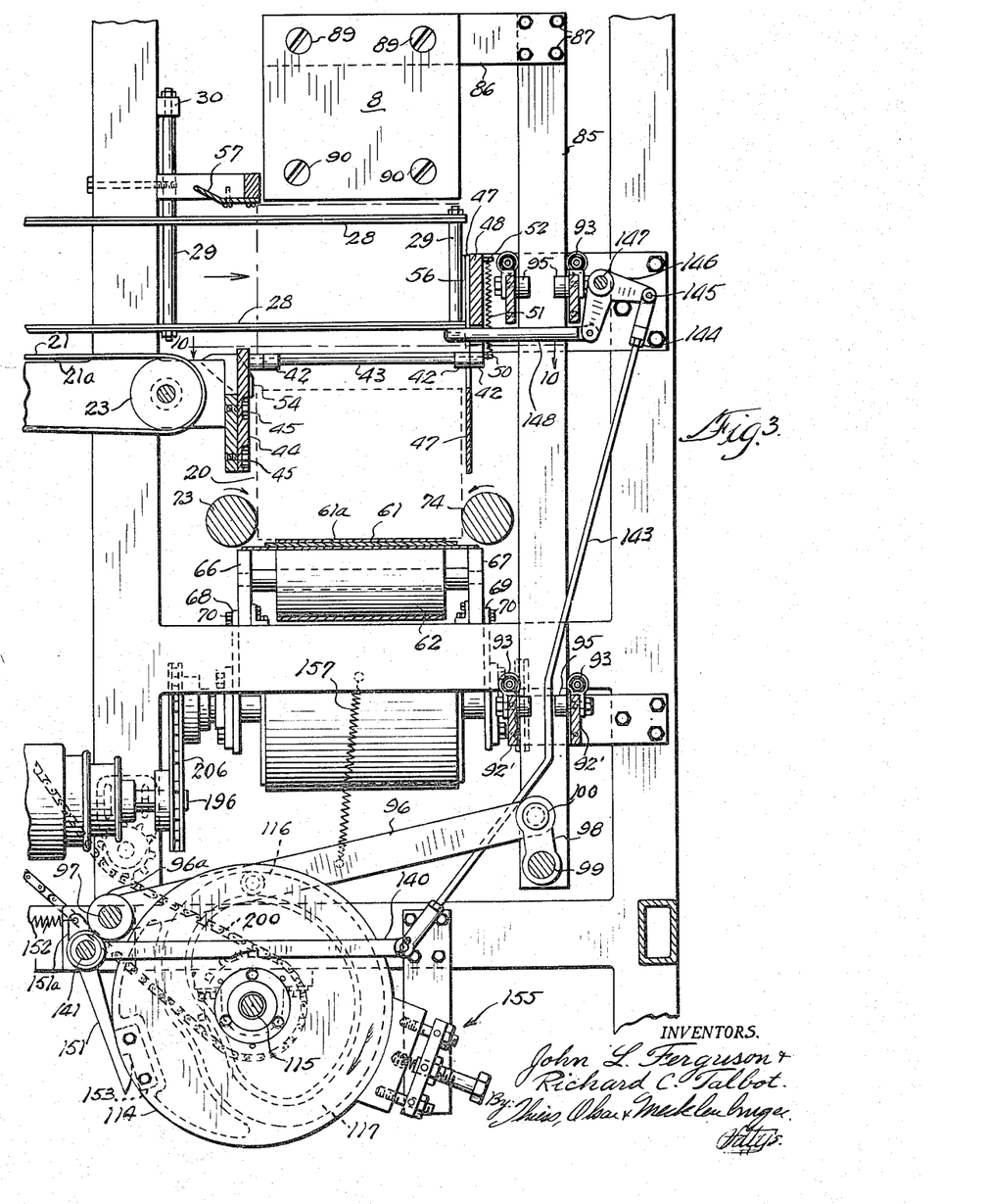
Fig. 3 is an enlarged partial cross-sectional view taken along the line 3—3 of Fig. 2.

A pair of stationary slides 54, best seen in Figs. 3 and 7, are provided for each lane or file A, B, C and D for facilitating the movement of packages from the conveyor belt 21 to the trap doors 40, each slide being secured by any suitable means such as screws 55 to the frame of the machine. A pair of rods 56, best seen in Fig. 10 are secured to the surface of the apron 47 in each of the four lanes and serve as stops to terminate the forward motion of the packages 20 in a position in which an entire package is supported by the resective trap door 40.

Directly above the slides 54 there is provided a guide member 57 serving each of the four lanes. This member holds the successive packages 20 down in proper position in the respective lanes A, B, C and D, each of which includes the conveyor belt 21, slides 54 and a trap door 40.

Located directly below the trap doors 40, there is another conveyor belt 61 which is arranged to transport the packages 20 in a direction at right angles to the direction of motion of the packages on the conveyor belt 21. The conveyor belt 61 operates over a pair of rollers 62 and 63, best seen in Fig. 6. The belt also extends around an idler roller 64 and a driving roller 65 which is driven by means to be described subsequently. Between the rollers 62 and 63 the belt 61 is supported by a plate 61a secured to the frame of the machine.

The rollers 62 and 63 are rotatably mounted in a pair of horizontally extending plates 66 and 67 which are rigidly secured to the frame of the machine. The driving roller 65 is rotatably mounted in a pair of horizontally extending plates 68 and 69 which are secured to the respective plates 66 and 67 as by screws 70. The idler roller 64 is rotatably mounted in slots 68a and 69a in the respective plates 68 and 69, both ends of the idler roller being adjustably positioned by an adjusting mechanism 71. This mechanism, like the adjustable mechanism 27 previously referred to, may be of any suitable form and accordingly, will not be described in detail herein. Its purpose is, of course, to control the tension of the conveyor belt 61.

Arranged along the longitudinal edges of the conveyor belt 61 are a pair of rollers 73 and 74. These rollers are spaced apart by a distance equal to the corresponding dimension of the packages 20 and each is rotated in such a direction as to urge the packages downwardly against the conveyor 61, the directions of respective rotation being indicated by arrows in Fig. 3. The rollers 73 and 74 thereby assure traction between the conveyor belt 61 and the packages 20 and serve the further purpose of centering the packages on the conveyor belt and maintaining them in the desired upright position. The rollers are rotatably mounted in suitable bearings 76, 77 and 78 which are rigidly secured to various fixed members of the machine. It will be noted in Figs. 2 and 6 that the bearings 76, 77 and 78 are smaller in diameter than the main portion of the rollers 73 and 74. The rollers are cut down at these points to permit the use of bearings of small outside diameter in order that the bearings may not protrude into the path of the packages. The assemblies at the bearings 77 can be accomplishd through the use of a split bearing or interrupted rollers, joined at the bearings 77. Means for driving the rollers 73 and 74 will be described subsequently.

A series of four plungers 81, 82, 83 and 84 are provided for driving the packages supported by the trap doors 40 down through the trap doors onto the conveyor belt 61. Each of these plungers comprises a pair of plates, the lowermost edges of which are arranged such that they may engage the upper surface of a package 20 near the longitudinal edges thereof, as best seen in Figs. 8 and 9.

Each of the four plungers is separately supported by one of four vertically extending bars 85. A pair of horizontally extending bars are secured to the uppermost end of each of the bars 85 at opposite sides thereof by fasteners such as nuts and bolts 87. Spacers 88 are provided between the horizontal bars 86 adjacent the plungers 81, 82, 83 and 84 to space these bars apart by a distance equal to the thickness of the vertical bar 85. The plates of the plungers are held together and secured to the respective horizontal bars 86 by screws 89. Near the lower edge of the plungers, the plunger plates are held together by screws 90, spacers 91 being provided between the plates to maintain the respective plates in substantially parallel relationship. The head of each of the screws 89 and 90 is preferably countersunk in one plate of a plunger and the threaded end tapped into the opposite plunger plate such that no portion of the screw extends beyond the exposed surfaces of the plungers. This is desirable since the various plungers must pass between the dividers 28 when they drive the packages down through the trap doors 40.

Figure 11:
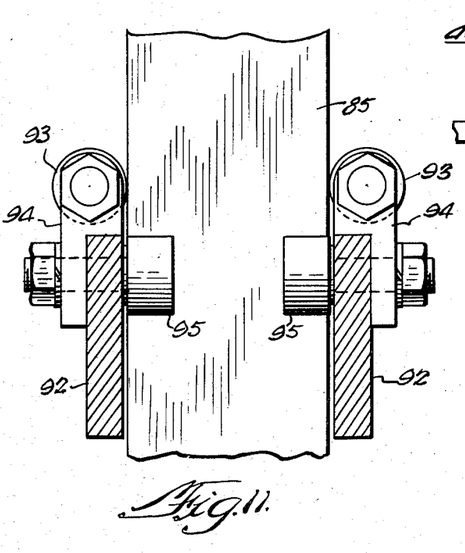
Fig. 11 is a detail cross-sectional view taken along the line 11—11 of Fig. 2.

The vertical bars 85 are separately and vertically movable to drive the various plungers and each is guided by two sets of roller bearings. As will be seen best in Fig. 2 two plates 92 are secured at their respective ends to the frame of the machine, one plate lying on each side of the four vertically extending bars 85. A series of roller bearings 93 are mounted on the plates 92 by brackets 94 and are arranged to engage the edges of the vertical bars 85, the bearings being shown in detail in Figs. 10 and 11. Other roller bearings 95 are rotatably mounted on the plates 92 and engage the two broad surfaces of the vertical bars 85 adjacent both edges thereof. Another pair of plates 92' is secured to the frame of the machine directly below the plates 92, these plates supporting bearings 93 and 95 identical to those mounted on the plates 92. Accordingly, each bar 85 is guided along a given vertical path, being restrained from movement in any horizontal direction at two spaced points along its length.

An operating arm 96 is provided for each of the four vertical bars 85, each arm 96 being pivotally secured at one end to the frame of the machine through a hub portion 96a and a shaft 97 which is common to the four arms 96. The other ends of these arms are secured to the lower ends of the respective bars 85 through respective links 98, one end of each link being pivotally secured to a bar 85 through a pin 99 while its other end is pivotally secured to the free end of an arm 96 through a pin 100.

It will now be apparent that as any one of the arms 96 pivots about the shaft 97, the corresponding vertical bar 85 and the corresponding plunger 81, 82, 83 or 84 will be moved up or down, the link 98 permitting the corresponding bar 85 to follow a fixed vertical path while the free end of the corresponding arm 96 traces an arcuate path. Pivotal movement of the four arms 96 is controlled independently by a series of four cams 111, 112, 113 and 114, all freely rotatable on a common shaft 115. These cams control the arms 96 and the various plungers through rollers 116 which are rotatably secured to the arms 96 and mesh with a corresponding cam.

The four cams are identical in construction, each including a cam track 117 for confining the corresponding roller 116. As will be noted in Figs. 3 and 4 rotation of the various cams in the direction indicated by the arrows in those figures will cause the corresponding rollers 116 to move first radially inwardly and then radially outwardly of the cam shaft 115. When a roller 116 is in the radially outward portion of the track 117, as illustrated in Fig. 3, the corresponding arm 96 and the corresponding plunger 81, 82, 83 or 84 will be in their raised positions. When a cam is turned to the position illustrated in Fig. 4, the corresponding roller 116 will lie in the radially inward portion of the track 117 with the result that the corresponding arm 96 and the corresponding plunger will be in their lowered positions. A plunger which is moved from its upper position illustrated in Fig. 3 to its lower position indicated in Fig. 4 may drive a package 20 down through the corresponding trap door 40 and onto the conveyor belt 61 as previously indicated.

Figures 12, 13, 14:
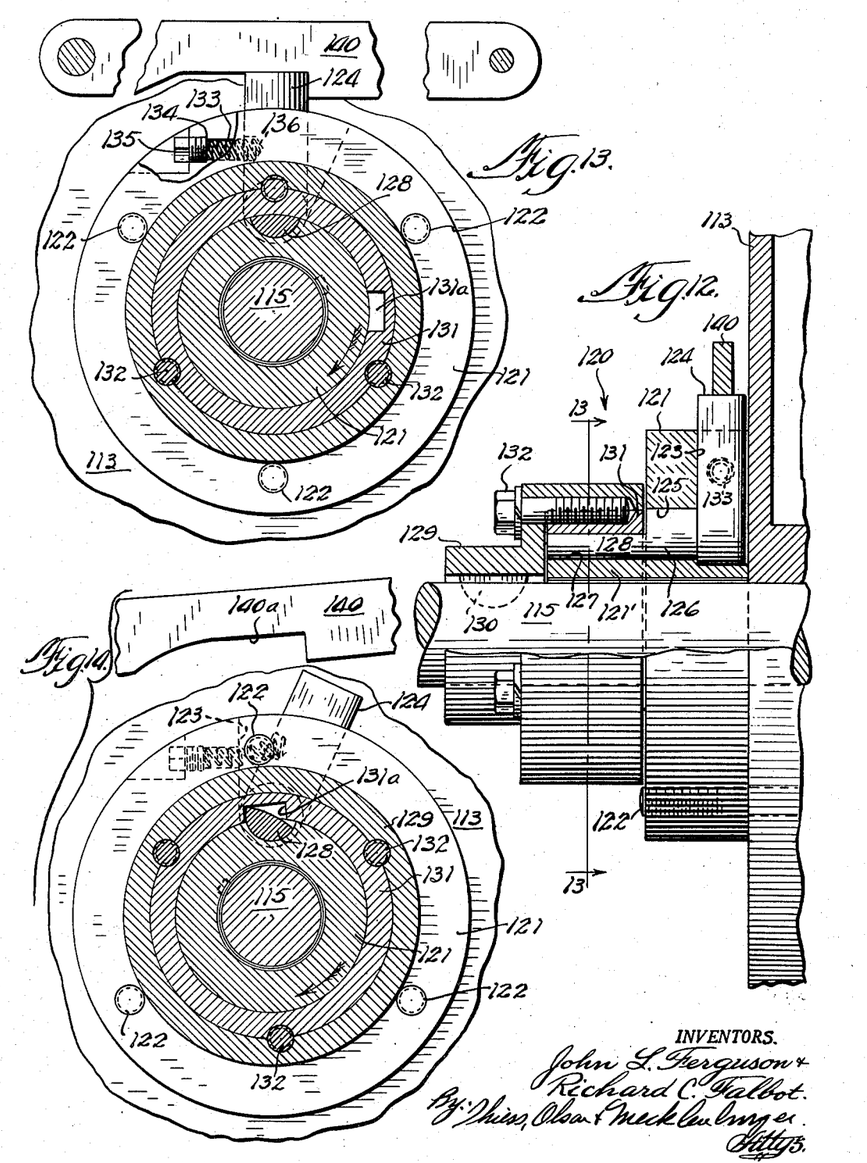
Fig. 12 is a detail cross-sectional view taken along the line 12—12 of Fig. 5.
Fig. 13 is a cross-sectional view taken along the line 13—13 of Fig. 12.
Fig. 14 is a detail view similar to Fig. 13, showing the apparatus in a different operating position.

The cams 111, 112, 113 and 114 are freely rotatable on the cam shaft 115, as indicated above, but are independently and selectively rotated thereby through a series of four clutch mechanisms 120 best seen in Figs. 12, 13 and 14. In Fig. 12, the cam 113 appears in cross-section, and a collar 121 is shown secured to one face thereof as by screws 122. The collar 121 is also freely rotatable with respect to the cam shaft 115 and has an opening 123 therein for receiving a dog 124. Another opening 125 in the collar 121 is provided which serves as a bearing for a journal 126 secured to or integral with the dog 124. An outwardly extending portion 121' of the collar 121 has an open slot 127 therein for receiving a key 128 secured to or integral with the journal 126 and the dog 124.

A bushing 129 is secured to the shaft 115 by a key 130 and extends axially over the outwardly extending portion 121' of the collar 121. A ring 131 is secured to the inner surface of the bushing 129 by screws 132, this ring having a notch 131a on its inner surface for selectively engaging the key 128.

It will be noted in Fig. 13 that when the dog 124 extends vertically, the key 128 can slide over the inner surface of the ring 131 as the shaft 115, the bushing, and the ring 131 rotate, while the collar 121 and the cam 113 remain stationary. However, when the notch 131a and the key 128 are aligned the dog 124 may tilt as illustrated in Fig. 13, in which position the key extends into the notch and engages one side thereof. Rotation of the shaft, bushing, and ring, which is continuous, will then cause rotation of the key 128 and hence of the collar 121 and the cam 113.

The dog 124 is urged in a clockwise direction as viewed in Figs. 13 and 14, or toward notch engaging position, by a compression spring 133 arranged in an opening 134 in the collar 121. A screw 135 threadedly engages the sides of the opening 134 to abut one end of the spring 133 and compress it, and a notch 136 is provided in the dog 124 for receiving the other end of the spring.

It will be apparent that when the notch 131a in the ring 131 has rotated beyond the position of the key 128, the key and hence the dog 124 cannot rotate to the position shown in Fig. 14 since the radially outward surface of the key is in engagement with the inner surface of the ring 131. However, when the notch 131a is in the position illustrated in Fig. 14 the dog 124 unless otherwise restrained will be moved in a clockwise direction as viewed in that figure by the spring 133, with the result that one corner of the key 128 will engage the notch 131a, locking the collar 121 and the cam 113 to the shaft 115 and causing rotation thereof.

Rotation of the dog 124 is controlled by a control mechanism which permits engagement of the key 128 with the notch 131a only when a package 20 is present on the corresponding trap door 40, in position to be driven down through the trap door 40 and onto the conveyor belt 61 by the corresponding plunger. This mechanism includes a control bar 140, best seen in Figs. 3, 4, 13 and 14 for each clutch mechanism 120. Each control bar 140 has a notch 140a therein through which it may engage the free end of the corresponding dog 124.

The control bars 140 are pivotally mounted at one end thereof on a common shaft 141 which is secured at its ends to the frame of the machine. The other end of each control bar is pivotally connected by a pin 142 to one end of a link 143. Each of the four links 143 is made adjustable in length by a turnbuckle mechanism 144 of conventional design at the two ends thereof. The other ends of the links 143 are pivotally secured by pins 145 to bell cranks 146 pivotally mounted on a common fixed shaft 147. Also pivotally connected to the bell cranks 146 are respective trigger bolts 148 which extend through openings 48a in the plate 48 and into the respective package lanes A, B, C and D.

Figure 4:
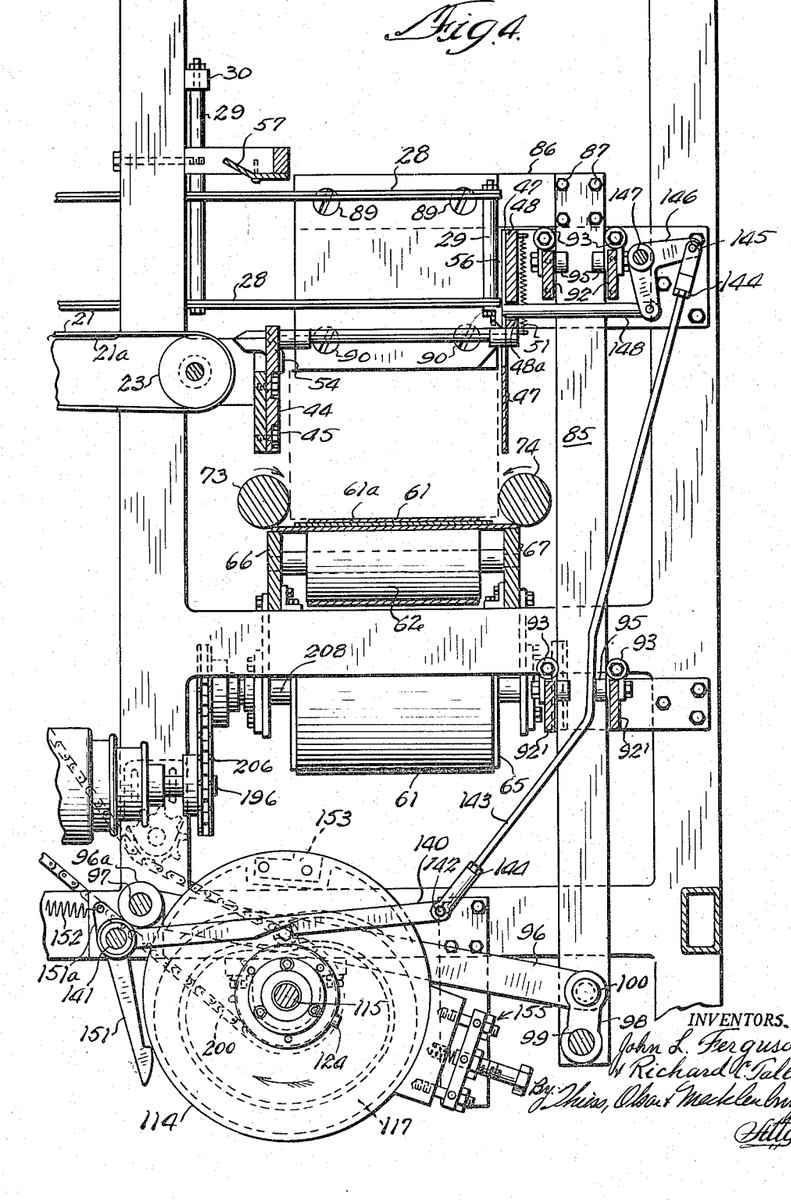
Fig. 4 is a cross-sectional view similar to Fig. 3 but showing the machine in a different operating position.

The control bars 140 and the links 143 are urged downwardly by their own weight to their normal or lowered positions illustrated in Fig. 3. When a control bar is in such position, the notch 140a therein is in position to engage the corresponding dog 124 whereby that dog is maintained in vertical position with the result that the associated key 128 will not engage the notch 131a in the ring 131 and the corresponding cam 111, 112, 113 or 114 will remain stationary. However, when a package 20 moves onto the trap door 40 of any one of the lanes A, B, C or D, the package thrusts the corresponding trigger bolt 148 to the right as illustrated in Fig. 4. This causes a counterclockwise pivotal movement of the corresponding bell crank 146 as viewed in that figure and the raising of the link 143 and the control bar 140. The raised position of the control bar 140 is also illustrated in Fig. 14 wherein it may be seen that the corresponding dog 124 is no longer restrained thereby from clockwise pivotal movement. Accordingly, when the notch 131a in the ring 131 next reaches a position facing the key 128 the dog 124 will pivot to the notch engaging position illustrated in Fig. 14 under the influence of the spring 133. The corresponding cam 111, 112, 113 or 114 will then be caused to rotate through at least one full revolution. Such rotation of the cam will cause operation of the corresponding plunger 81, 82, 83 or 84 whereby the plunger will drive the package 20 down through the trap door 40 and onto the conveyor belt 61. The dog 124 will remain in its clockwise position under the influence of the corresponding spring 133 until at least one full revolution of the cam shaft 115 has been completed. During that revolution of the cam, and at a time substantially prior to the completion thereof, the corresponding plunger will be raised again to the position illustrated in Fig. 3 with the result that another package 20 may be propelled onto the corresponding trap door 40 in time to be driven down through the trap door by the plunger during the next rotation of the corresponding cam.

Prior to the completion of such an operation the trigger bolt 148 in the exemplary lane referred to above is free to move to the left as viewed in Figs. 3 and 4 and accordingly the link 143 and the control bars 140 will drop to their normal positions in which the sides of the notch 140a may engage the corresponding dog 124. If a succeeding package is available in that lane to be propelled forwardly to a position on the corresponding trap door 40, the corresponding trigger bolt 148 will be pushed to the right and the associated control bar 140 raised before the corresponding dog 124 reaches the position shown in Figs. 13 and 14 with the result that the dog 124 will remain in its clockwise position and drive the associated cam through at least one more complete revolution without having been disengaged from the cam shaft 115.

However, if a package 20 is not immediately available in that lane on the conveyor belt 21 to actuate the corresponding trigger bolt 148, the associated control bar 140 will remain in its lowered position as the associated cam and the cam shaft 115 complete a revolution. In such case, the leading edge of the corresponding dog 124 strikes the edge of the notch 140a in the associated control bar and is pivoted to its vertical position illustrated in Fig. 13. The cam shaft 115 and the bushing 129 and the ring 131 associated with that dog will continue rotation leaving the associated cam and its connected parts stationary, the cam and connected parts being restrained from forward rotation by engagement of the dog 124 with the control bar 140 and the driving connection between the cam shaft and that particular cam having been broken by disengagement of the key 123 from the notch 131a.

If a package then strikes a trigger bolt 148 immediately after the notch 131a has left the position illustrated in Fig. 14, the associated cam will not be rotated until a revolution of the shaft 115 has been completed and the notch 131a again brought into the position illustrated in Fig. 14 at which time the dog 124 may tilt in a clockwise direction and the key 123 again engage the sides of the notch 131a.

The four notches 131a of the four clutch mechanisms 120 are arranged in the same angular position with the result that a revolution of any one or more of the cams 111, 112, 113 and 114 can be started only at the same spaced points in time. This arrangement eliminates the possibility of a package 20 being driven down through a trap door 40 by one of the plungers while other packages 20 are positioned on the conveyor belt 61 at a point immediately therebelow with resultant interference between packages. The timing of the machine is such that any number of packages from one to four which are pushed down through the various trap doors during one cycle of the machine will be removed by the conveyor belt 61 from their positions immediately below the trap doors in time to prevent interference between those packages and any subsequent packages which may be pushed down onto the conveyor belt 61 during the next cycle of the machine. Interference between packages on the conveyor belt 61 is eliminated then by the cyclical operation of the machine.

If each of the cams 111, 112, 113 and 114 were permanently locked to the cam shaft 115 cyclical operation of the machine would be obtained which would prevent interference between packages on the conveyor belt 61. However, in such case, a package 20 might arrive in the vicinity of the trap doors 40 just as the plungers started their downward movement with the result that the package would be jammed between a plunger and the slides 54 with resultant damage to the package or the machine or both. The clutch mechanisms 120 and the associated control apparatus eliminate this possibility by permitting actuation of the corresponding plunger only when a package is in proper position on the corresponding trap door 40.

It is desirable that there be no substantial backlash of the cams 111, 112, 113 and 114 when rotation thereof is interrupted by engagement of the associated dog 124 with the corresponding control bar 140. For this purpose a latch 151 is provided for each cam, the four latches being pivotally mounted on the same shaft 141 about which the control bars 140 pivot. Ears 151a secured to or integral with corresponding latches and extending to the opposite side of the shaft 141 are urged to the left in Figs. 3 and 4 by tension springs 152 which are secured at one end to the ears 151a and at the other end to the frame of the machine. The free ends of the latches are thereby resiliently urged toward the corresponding cams.

On each cam there is a catch 153 which is in position to be engaged by the corresponding latch 151 when the cam is in such position that the corresponding dog 124 is in the position illustrated in Fig. 13; and since it is in this position that the rotation of the cams may be interrupted by reengagement of the associated dog with the corresponding control bar, the latches 151 and the catches 153 are effective to prevent backlash of the cams. The latch 151 and the catch 153 form a one way stop as will be readily apparent upon inspection of Figs. 3 and 4, the sloping surface at the free end of the latch permitting it to ride over the catch when the cam rotates in the direction indicated by the arrows in those figures.

A brake mechanism 155 is provided for each of the cams. The brake mechanisms are secured to the frame of the machine and resiliently engage the respective cams and serve to steady the operation of the cams. Since these mechanisms are of conventional design and do not, in themselves, constitute an inventive feature of the machine, they will not be described in detail herein.

In order to reduce wear of the rollers 116 and the cam tracks 117, it is desirable that at least a portion of the weight of the arms 96, the vertical bars 85 and the four plungers be counterbalanced. This may be accomplished by any one of various well-known devices, and springs 157 are provided for this purpose in the embodiment of the invention illustrated. One spring is provided for each plunger mechanism, one end of each spring being connected to one of the arms 96 and the other end being secured to the frame of the machine.

Figure 5:
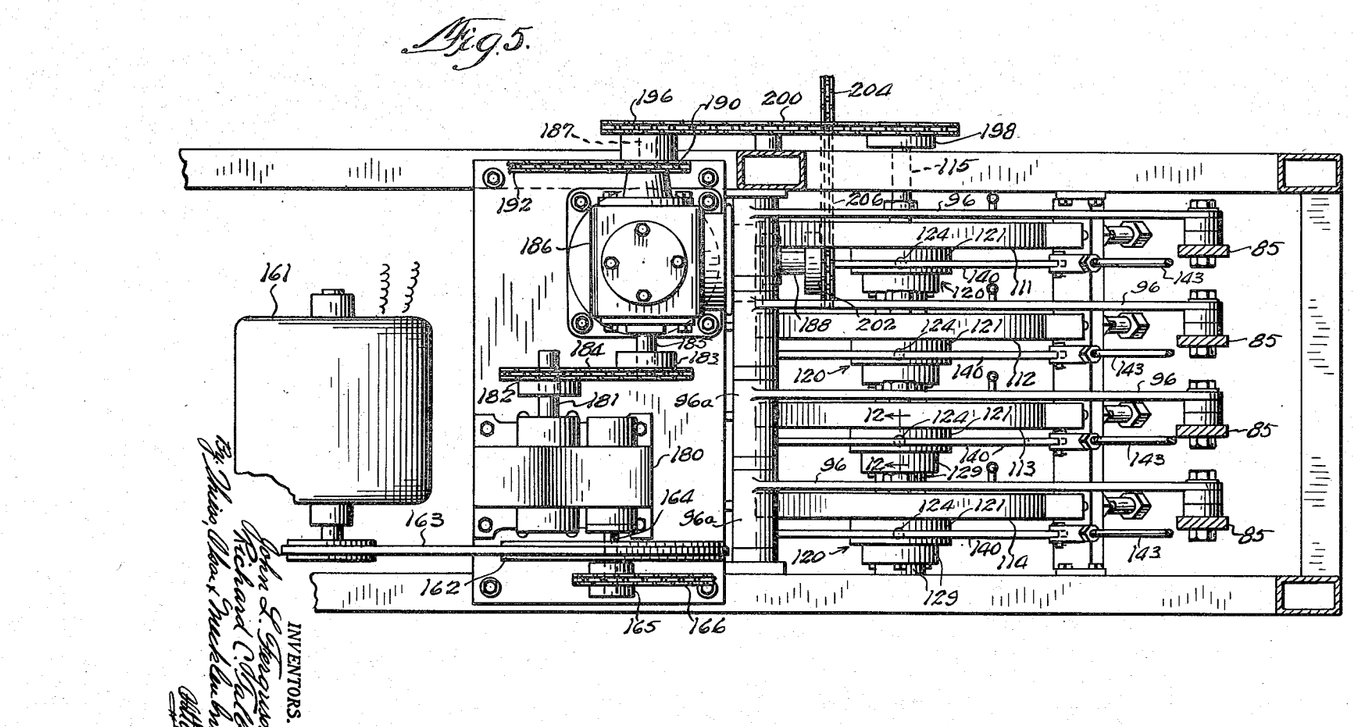
Fig. 5 is an enlarged cross-sectional plan view of the same machine taken along the line 5—5 of Fig. 1.

In the illustrated embodiment of the invention the cams 111, 112, 113 and 114 and the two conveyor belts 21 and 61 are driven by a single power source 161 which is preferably an electric motor. This motor drives a pulley 162 through a belt 163, as best seen in Figs. 1 and 5. The pulley 162 is mounted on a shaft 164 on which there is also mounted a sprocket wheel 165. This sprocket wheel drivingly engages a chain 166 which also passes over and engages a pair of sprocket wheels 167 and 168 and an idler sprocket 169.

The sprocket wheel 167 is secured to a shaft 170 which is rotatably mounted in the frame of the machine and to which another sprocket 171 is secured. The latter sprocket wheel drives a chain 172 which in turn drives a sprocket wheel 173, secured to the roller 74. Through this means the roller 74 is driven by the motor 169 in the direction of the arrow appearing in Fig. 1.

Similarly the sprocket 168 is secured to a shaft 174 which is rotatably mounted in the frame of the machine and which has secured thereto a second sprocket 175. The latter drives a chain 176 which in turn drives a sprocket 177 secured to the roller 73. By this means the motor 161 drives the roller 73 in the direction indicated by the arrow in Fig. 1. The idler sprocket 169 is secured to a shaft 178 which is rotatably mounted in the supporting bracket of the bearing 76 which supports the roller 73. The idler sprocket serves primarily to maintain the chain 166 in proper engagement with the sprocket wheel 168.

The other end of the shaft 164 to which the pulley 162 is secured extends into a speed reducing gear box 180. A shaft 181, rotating at a lower speed than the shaft 164, extends out of the opposite side of the gear box 180 and has mounted thereon a sprocket wheel 182 which drives another sprocket wheel 183 through a chain 184. The sprocket 183 is mounted on a shaft 185 which extends into a gear box 186. Two driven shafts 187 and 188 extend out of the gear box 186, the latter shaft being at right angles to the shaft 185 and being driven thereby through bevel gears not shown in the drawings.

The shaft 187 has secured thereto a sprocket wheel 190 which drives a sprocket wheel 191 through a chain 192. The sprocket wheel 191 is secured to the same shaft as the roller 26 and it is through this means that the conveyor belt 21 is driven by the motor 161.

The shaft 187 also has secured thereto a sprocket wheel 196 which drives another sprocket wheel 198 through a chain 200. The sprocket wheel 198 is secured to the cam shaft 115 upon which the cams 111, 112, 113 and 114 are rotatably mounted as previously explained.

The shaft 188 has secured thereto a sprocket wheel 202 which drives another sprocket wheel 204 through a chain 206, as best seen in Figs. 5 and 7. The sprocket wheel 204 is secured to a shaft 208 upon which the roller 65 is mounted, this roller driving the conveyor belt 61 as previously explained.

Figure 6:
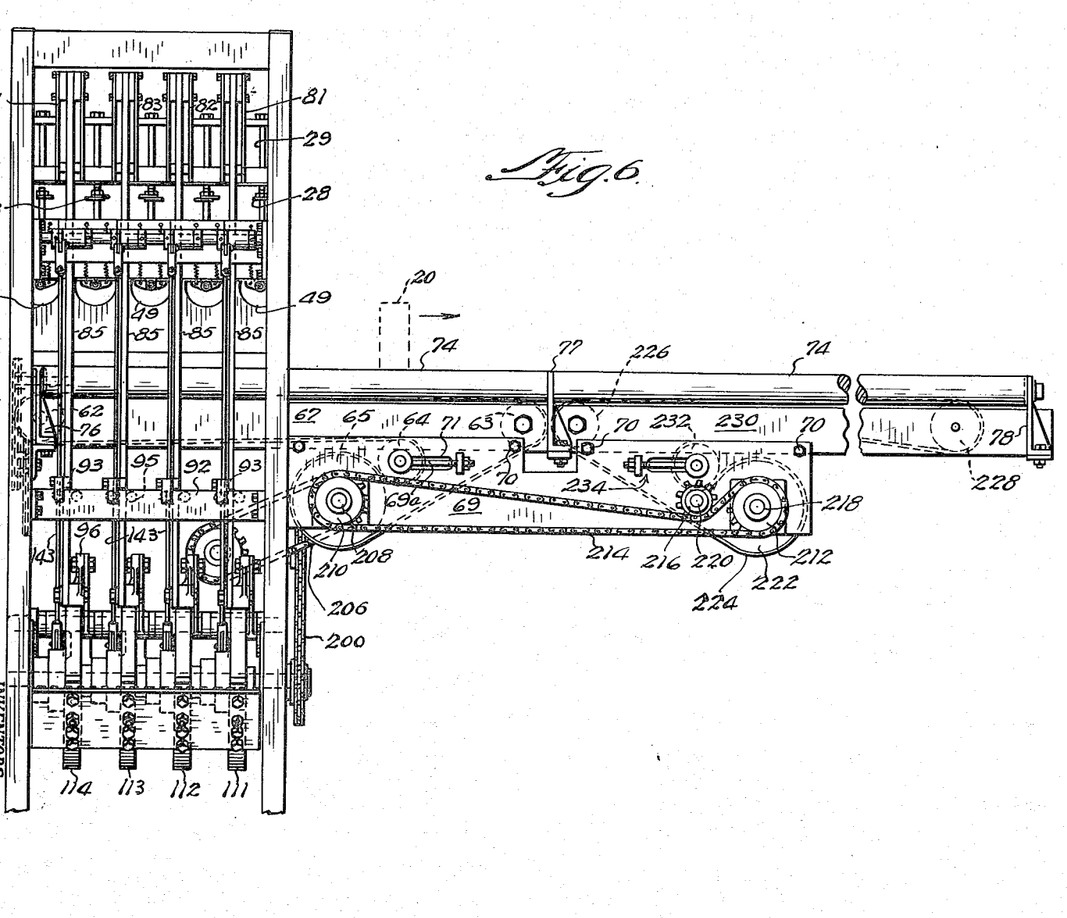
Fig. 6 is an end elevational view of the same machine.

Also secured to the shaft 208, as best seen in Figs. 2 and 6, is another sprocket 210, which drives still another sprocket 212 through a chain 214 which also passes around an idler sprocket 216. The two sprockets 212 and 216 are secured to shafts 218 and 220 respectively, both of which are rotatably mounted in the plates 69. The shaft 218 also has mounted thereon a roller 222 which drives a conveyor belt 224 seen in Figs. 2 and 6. This conveyor belt passes over a pair of rollers 226 and 228 rotatably mounted in a pair of fixed plates 230 and over an idler roller 232 rotatably supported by the plates 69. An adjusting mechanism 234 is provided for adjusting the position of the idler roller 232 to control the tension of the belt 224. Since the adjusting mechanism 234 may be of any conventional design it will not be described in detail herein.

The conveyor belt 224 serves as an extension of the conveyor belt 61 and may be used to carry the single file of packages to a case loading machine as suggested above. It will be noted in Figs. 2 and 6 that the two rollers 73 and 74 extend beyond the effective length of the conveyor belt 61 and alongside the conveyor belt 224. Accordingly, these rollers serve to maintain packages in their proper position on both of the conveyor belts 61 and 224.

The various elements of the machine now having been described in detail, it is believed that the machine as a whole will best be understood by an explanation of a typical operation. Let is be assumed that packages 20 are being deposited on the conveyor belt 21 in single file from four different sources, the packages from each source being fed into a predetermined one of the lanes A, B, C or D. Let it be assumed further that the machine has just forced four packages, one from each lane, down through the trap doors 40 and onto the conveyor belt 61, and that packages in lanes A and D are awaiting an opportunity to leave the conveyor belt 21 and pass out onto the corresponding trap doors 40, while packages in lanes B and C are somewhat farther back on the conveyor belt 21, all as suggested by the dotted line representations of packages in Fig. 2. Under these conditions the packages in lanes A and D are being urged against the edges of the plungers 81 and 84, all four of the plungers being in their lowered positions.

The various plungers 81, 82, 83 and 84 will remain in their uppermost position for a substantial period of time during the latter portion of this cycle as may readily be understood by reference to Figs. 3 and 4 where it will be noted that the radially outward portion of each cam track 117 extends over an angle of nearly 180°. During the period of time that the plungers are in their uppermost positions, the packages 20 in lanes A and D will move out onto the respective trap doors 40 and drive the respective trigger bolts 148 to the right, as the machine is viewed in Figs. 1, 3 and 4. These two packages will momentarily remain stationary while awaiting the next downward movement of the plungers 81 and 84. Also during this period of time, the packages 20 in lanes B and C will continue their forward movement, but let it be assumed the notches 131a, of the respective clutch mechanisms 120, simultaneously arrive at their uppermost position illustrated in Fig. 14 at the time that the forward edges of the package in lane C leaves the slides 54 and starts out onto the trap door 40 in lane C.

The clutch mechanisms 120 driving the cams 111, and 114, corresponding to lanes A and D respectively, will become effective by virtue of the engagement of the respective keys 128 with the corresponding notches 131a since the control bars 140 associated with those clutches will have been raised by the operation of the corresponding triger bolts 148. The clutch mechanisms associated with the cams 112 and 113 will become ineffective by virtue of the engagement of the dogs 124 with the corresponding control bars 140, since the triger bolts 148 in lanes B and C have not yet been engaged and actuated by packages in those lanes.

At the beginning of this cycle, then, it has been determined that only the plungers 81 and 84 will operate, and these plungers will drive the packages in lanes A and D down through the respective trap doors and onto the conveyor belt 61. If all four plungers were made to operate during this cycle the plunger 83 would strike the package in lane C while it was approximately half way onto the corresponding trap door 40 and would either crush the package or damage the machine or both. This undesirable result is avoided through the use of the clutch control mechanism which permits or instigates operation of the associated cam and plunger only when a package is properly located on the corresponding trap door ready to be driven down through the trap door and onto the conveyor belt 61.

If the machine did not operate cyclically, the package 20 in lane C might be driven down through the trap door 40 in lane C at about the time that the package in lane D has reached the conveyor belt 61 and started moving forward thereon. The package in lane C might then strike the package from lane D, toppling over both packages and thus interrupting the operation of the machine. The cyclical operation of the machine eliminates the possibility of such difficulty since the packages in lanes B and C, in the example suggested, cannot start their downward movement until the beginning of the next cycle of operation, at which time the packages from lanes A and D will have been completely removed from the space below the various plungers.

Thus it is seen that the two major difficulties have been eliminated in the process of collecting packages arranged in irregular sequence in a plurality of supply files and placing them on a single conveyor or in a single file. Specifically, interference between packages is avoided by the cyclical operation of the machine, and damage to packages or the machine is avoided by controlling the package displacing apparatus such that it does not operate during a given cycle unless a package is in proper position at the beginning of that cycle.

In its broader aspects the invention is not limited to the particular method or apparatus disclosed in the drawings but might take any one of a large number of forms. For example, the conveyor belts 61 and 26 might be replaced by chutes on which the packages might slide, and the plungers 81, 82, 83 and 84 might be eliminated in favor of mechanically operated trap doors. Still further, what has been termed in the specification as a package 20 may actually constitute two or more independent packages or other items of substantially uniform size and shape. The term package as employed herein is intended to be interpreted as including any one or more items which are to be handled or may be handled as a single unit or package.

It will be apparent that the invention may be varied in its physical embodiment without departing from the spirit of the invention, and it is desired, therefore, that the invention be limited only by the prior art and the scope of the appended claims.

The invention having thus been described, what is claimed and desired to be secured by Letters Patent is:

1. In a machine for arranging in a moving file packages fed thereto in a plurality of supply files and in irregular sequence, said supply files lying substantially in a common plane; means for displacing packages from a predetermined position in each of said supply files in a direction substantially perpendicular to said plane and into said first-mentioned file, said means being cyclical in operation and starting displacement, only at predetermined times common to said plurality of supply files, of one package each from any number of said predetermined positions in which a package is available at said predetermined times, and control means for each of said supply files, each of said control means being actuatable by the arrival of a package at said predetermined position in the corresponding one of said supply files for determining at the begining of each cycle of operation whether said displacing means shall be effective as to the corresponding one of said supply files during that cycle.

2. In a machine for arranging in a continuously moving file packages fed thereto in a plurality of supply files and in irregular sequence; means for displacing packages from a predetermined position in each of said supply files into said first-mentioned file, said means being cyclical in operation and starting displacement, only at predetermined times common to said plurality of supply files, of one package each from any number of said predetermined positions in which a package is available at said predetermined times, and control means for each of said supply files, each of said control means being actuatable by the arrival of a package at said predetermined position in the corresponding one of said supply files to condition said displacing means to displace said package during the next operational cycle thereof, said displacing means being effective to operate during any one cycle on only those supply files of which the corresponding control means has been so actuated prior to the beginning of said cycle.

3. In a machine for arranging in a continuously moving file packages fed thereto in a plurality of supply files and in irregular sequence; a plurality of plunger means, one for each of said supply files, for displacing packages from each of said supply files into said first-mentioned file, said plunger means being cyclical in operation and starting displacement, only at predetermined times common to said plurality of supply files, of one package each from any number of said predetermined positions in which a package is available at said predetermined times, each cycle of operation of said means being of such duration as to permit removal of the packages placed in said first-mentioned moving file in one operational cycle prior to placement therein of additional packages during the next subsequent cycle and a plurality of control means, one for each of said supply files, each of said control means being actuatable by a package in the corresponding one of said supply files to determine at the beginning of each cycle of operation whether the corresponding plunger means shall be operative during that cycle 4. In a machine for arranging in a continuously moving file packages fed thereto in a plurality of supply files and in irregular sequence; a plurality of means associated one each with said supply files for displacing a package from a predetermined position in the associated one of said supply files into said first-mentioned file, each of said means being cyclical in operation and arranged to start such displacement operations only at predetermined times common to said plurality of displacing means, and control means associated with each of said displacing means actuatable by the arrival of a package at said predetermined position in the associated one of said supply files to condition said displacing means to displace said package during the next operational cycle thereof.

5. In a machine for arranging in a continuously moving file packages fed thereto in a plurality of supply files and in irregular sequence; a plurality of plungers, each associated with one of said supply files, for displacing packages from a predetermined position in each of said supply files directly into said first-mentioned file, driving means for said plungers, said means being cyclical in operation and starting operation of said plungers, only at predetermined times common to said plurality of supply files, to displace one package each from any number of said predetermined positions in which a package is available at said predetermined times, and control means for each of said plungers, each of said control means being actuatable by the arrival of a package at said predetermined position in the corresponding one of said supply files for determining at the beginning of each cycle of operation whether said driving means shall be effective as to the corresponding one of said plungers during that cycle.

6. In a machine for arranging in a moving file packages fed thereto in a plurality of supply files and in irregular sequence; a plurality of trap doors, each for supporting a package in one of said supply files, said trap doors being located directly above said first-mentioned file, a plurality of plungers, each associated with one of said supply files, for driving packages through said trap doors and into said first-mentioned file, drive means for said plungers, said means being cyclical in operation and starting operation of said plungers only at predetermined times common to said supply files, to drive one package each from any number of said files through the corresponding ones of said trap doors on which a package is available at said predetermined times, and control means for each of said plungers, each of said control means being actuatable by the arrival of a package on the corresponding one of said trap doors for determining at the beginning of each cycle of operation whether said driving means shall be effective as to the corresponding one of said plungers during that cycle.

7. In a machine for arranging in moving file packages fed thereto in a plurality of supply files and in irregular sequence; a plurality of plungers, each associated with one of said supply files, for moving a package from a predetermined position in the associated one of said supply files into said first-mentioned file, a driving cam for each of said plungers, a clutch for each of said cams, a drive shaft, the driving portion of each of said clutches being secured to said shaft and being engageable with the driven portions of said clutches only when said shaft is in one predetermined angular position common to said plurality of clutches, whereby said plungers are driven cyclically and said cams and said plungers may start a cycle of operation only at predetermined times common to said plurality of plungers, and control means for each of said plurality of files and associated with each of said clutches, said control means being actuatable by the arrival of a package to said predetermined position in the associated one of said supply files to condition said clutch to engage and to operate the associated cam and plunger during the next operational cycle.

References Cited in the file of this patent

UNITED STATES PATENTS

| | | |
|---|---|---|
| 1,425,556 | Tingwall et al. | Aug. 15, 1922 |
| 1,453,720 | Nitsch et al. | May 1, 1923 |
| 2,090,129 | Kimball et al. | Aug. 17, 1937 |
| 2,141,212 | Kimball et al. | Dec. 27, 1938 |
| 2,296,802 | Thompson | Sept. 22, 1942 |